US005363266A

United States Patent [19]

Wiseman et al.

[11] Patent Number: 5,363,266

[45] Date of Patent: Nov. 8, 1994

[54] ELECTRICAL SURGE ARRESTER

[75] Inventors: Gary H. Wiseman, San Francisco; William M. Robinson, Palo Alto; Jeffrey A. Bennett, Sunnyvale; Ronald J. Mosso, Fremont; John T. Fossett, Mt. View, all of Calif.

[73] Assignee: Raychem Corporation, Menlo Park, Calif.

[21] Appl. No.: 900,855

[22] Filed: Jun. 18, 1992

[51] Int. Cl.[5] .......................... H02H 1/00; H02H 3/22

[52] U.S. Cl. ...................................... 361/127; 361/117

[58] Field of Search ......................... 361/117, 126, 127

[56] References Cited

U.S. PATENT DOCUMENTS

| | | | |
|---|---|---|---|
| Re. 24,915 | 12/1960 | Pittman | 311/231 |
| 2,721,958 | 10/1955 | Pidoux | 315/52 |
| 3,018,406 | 1/1962 | Innis | 315/36 |
| 3,155,874 | 11/1964 | Sorro et al. | 315/36 |
| 3,227,983 | 1/1966 | Braun | 338/21 |
| 3,283,196 | 11/1966 | Parker et al. | 313/231 |
| 4,298,900 | 11/1981 | Avdeenko et al. | 361/127 |
| 4,467,387 | 8/1984 | Bergh et al. | 361/132 |
| 4,851,955 | 7/1989 | Doone et al. | 361/117 |
| 4,864,456 | 9/1989 | Thuillier et al. | 361/126 |
| 4,905,118 | 2/1990 | Sakich | 361/117 |
| 4,930,039 | 5/1990 | Woodworth et al. | 361/227 |
| 4,989,115 | 1/1991 | Bourdages et al. | 361/126 |
| 5,043,838 | 8/1991 | Sakich | 361/117 |
| 5,047,891 | 9/1991 | Nedriga | 361/117 |
| 5,050,032 | 9/1991 | Thevenet et al. | 361/117 |
| 5,088,001 | 2/1992 | Yaworski et al. | 361/127 |

FOREIGN PATENT DOCUMENTS

| | | | |
|---|---|---|---|
| 73984/91 | 10/1991 | Australia | H01C 7/12 |
| 2030740 | 11/1991 | Canada | H02H 3/22 |
| 0230103A2 | 7/1986 | European Pat. Off. | H01C 7/12 |
| 0141239A1 | 6/1989 | European Pat. Off. | H01C 7/12 |
| 0335480 | 10/1989 | European Pat. Off. | H01T 1/15 |
| 0372106A1 | 6/1990 | European Pat. Off. | H01C 7/12 |
| 0393854 | 10/1990 | European Pat. Off. | H01T 1/15 |
| 0443286 | 8/1991 | European Pat. Off. | H01C 7/12 |
| 2641423 | 7/1990 | France | H01T 1/15 |
| 63-308649 | 4/1985 | Japan | H01C 17/46 |
| 62-139301 | 6/1987 | Japan | H01C 7/12 |
| 62-26814 | 11/1987 | Japan | H01B 17/46 |
| 62-274511 | 11/1987 | Japan | H01B 17/46 |
| 63-45805 | 2/1988 | Japan | H01C 7/12 |
| 63-312602 | 12/1988 | Japan | H01C 7/12 |
| 1-243319 | 9/1989 | Japan | H01C 7/12 |

OTHER PUBLICATIONS

ABB Surge Arrester Type MVK Jan. 92.

"Development and Application of Lighting Arresters For Transmission Lines" IEEE Transaction on Power Delivery, vol. 4, No. 4., Oct. 1989.

Patent Abstracts of Japan vol. 13, No. 437 (E-826) 29 Sep. 1989 & JP, A 01 166 421 (NGK Insulators) 30 Jun. 1989.

*Primary Examiner*—A. D. Pellinen
*Assistant Examiner*—Ronald W. Leja
*Attorney, Agent, or Firm*—Yuan Chao; A. Stephen Zavell; Herbert G. Burkard

[57] ABSTRACT

A sealed vented surge arrester and method of manufacture is described wherein the valve elements are held under compressive loading while strength members including a moisture sealing void filling compound are pressed fit from the sides of the unit with a shed applied over it. The design achieves all the desirable features of tubular strength members with an ease of manufacture from utilizing half-shell or more members which can be applied from the sides along the longitudinal axis of the valve elements during manufacture to provide better void filling between the structural members and the valve elements.

27 Claims, 6 Drawing Sheets

ELECTRICAL SURGE ARRESTER

TECHNICAL FIELD OF THE INVENTION

This application relates to electrical distribution networks. More specifically, this application relates to an electrical surge arrester that is used in electrical distribution networks.

BACKGROUND OF THE INVENTION

In electrical distribution networks, it is necessary to protect equipment connected along the distribution network from damage which may be introduced by power or voltage surges from lightning or voltage overloads. This is often accomplished by the insertion into the system of a surge arrester. A surge arrester is an electrical device whose function is to protect electrical power distribution systems from overvoltages due to lightning, switching surges, and temporary power frequency overvoltages due to line-to-ground faults, ferroesonance, etc. Present day surge arresters generally consist of voltage non-linear elements, commonly called valve elements, enclosed in one or more housings made of porcelain, fiber-reinforced materials, polymeric resins, and the like. Said voltage non-linear elements may include spark gaps alone and/or in combination with valve elements made of silicone carbide (SIC), zinc oxide (ZnO), titanium dioxide, or strontium titanate. Recent surge arrester designs utilize ZnO valve elements without spark gaps, so-called gapless arresters.

The surge arrester is commonly attached to the electrical distribution system in a parallel configuration, with one end of the device connected to the electrical system and the other end connected to ground. At normal system voltages, the surge arrester is electrically resistant to current flow. However, if an overvoltage condition occurs, the surge arrester becomes conductive and shunts the surge energy to ground while "clamping" or limiting the voltage to an acceptable value. In this manner, the surge arrester protects other equipment attached to the system from the possibly deleterious effects of overvoltage surges.

Surge arresters were originally made with heavy porcelain housings that made them cumbersome to install and subject to breakage. Later improvements included semiconductive varistor valve elements such as doped ZnO, polymeric plastic sheds or housings and composite internal structural members. Recent advances in surge arrester design and products have focused on primarily four areas.

Polymeric structural members and housings have been used outside the valvo and terminal elements. These housings are less heavy than prior ceramic housing and also less fragile. However, these housings are not vented and problems with explosive fragmentation can occur.

Other advances have focused both on eliminating the cause of arrester failures as well as reducing the hazards of failure. Failure is often caused by degradation of the valve elements and device through the ingress of moisture. A second area of recent improvement is interface sealing between the outer housing and the structural element, or terminal element, to avoid gross areas of moisture ingress. An example is illustrated in U.S. Pat. No. 4,851,955.

Another type of moisture ingress, diffusion through the housing materials, can occur in a completely sealed design. This moisture diffusion problem is addressed with a void-free design. However, this design may also fragment during a failure event.

The fragmentation problem was addressed with a vented fiberglass, structural, member where the gases escape during a failure event through slits in a tubular housing. This is illustrated in U.S. Pat. No. 4,930,039 the disclosure of which is incorporated herein by reference for all purposes, as well as Japanese disclosure S63(1988)-312602 of Dec. 21, 1988.

Manufacturing a device which requires insertion of a valve element into the tubular outer structural member and sealing it to ensure that it is void free is an exceedingly complex, time consuming and difficult task, if achievable at all. Providing fragmentation explosion resistance with venting in a sealed, void free unit is a complex problem. Satisfying all these requirements in a design which provides ease of manufacturability raises even more complex issues.

Thus it would be highly desirable to have a sealed void free but venting surge arrester which can be manufactured in a simple and straight forward process with a minimum of complex assembly operations.

SUMMARY OF THE INVENTION

The invention provides for a sealed easily assembled surge arrester and a method of assembling the surge arrester. The surge arrester of the present invention also fulfills all of the other requirements of such a device, including being mechanically strong, providing means for connecting the arrester to the electrical system and to ground, providing means for maintaining a compressive force on the valve elements, providing means for accommodating differences in expansion and contraction of the valve elements and the other arrester components, being resistant to weathering and environmental pollution, and being light in weight and easy to install. Another important attribute of the surge arrester of the present invention is that it may be manufactured from readily available, inexpensive components and is amenable to automated manufacturing processes. Whereas, prior art surge arresters may have met some of these requirements, it is a unique feature of the present invention that it meets all of these stated requirements plus ease of manufacturing the sealed void free arrester.

More specifically, the invention includes at least two or a plurality, generally less than 5 structural strength members/sections which fit around the valve elements such as varistor blocks, pressed between end terminals. If the valve elements are cylindrical or tubular then the structural members are preferably arced cylindrical members, as illustrated. The structural members are mechanically fixed to the end terminals with screws or pins and the like under sufficient tension to maintain the valve element(s) under sufficient compression to provide good electrical contact which permits the current surge to pass therethrough upon lightning or other power surge striking the arrester. Voids between and around the varistor disks or blocks and the strength members are filled with a moisture insensitive void filling compound which can easily give way to arcing gases. This material seals the spaces between the valve elements and the structural member, but should not form a bond to the valve elements. Such a bond could damage the valve element or the arresters performance during thermal cycling. The optional outer polymeric housing should be adhesively and moisture excludingly bonded to the structural members and preferably also to the end terminals but preferably mechanically isolated from the valve elements.

The method comprises stacking the valve elements, e.g. varistor disk(s), along a longitudinal axis, compressing the valve elements between conductive end terminals and maintaining the valve elements under compression through the collapsing of appropriate compression members such as springs, e.g., Belleville washer, while the outer arc like strength members are attached to the terminals by screws, pins and the like. More generally the valve elements(s) must be maintained in compressive abuttment to permit current to flow therethrough with a minimum of resistance. The strength members may also be attached by adhesive or mechanical wedges, but this is less preferred because adhesive cure time adds to cycle time manufacturing costs and the mechanical wedge relies on compression or friction. During the attachment of the strength members, the members or valve elements are coated with a moisture resistant void filling compound which fills all the gaps to effectively seal all voids between the structural strength members, the valve element, and the end terminals. Alternatively, the void filling can be done with a direct molding of the polymeric outer housing to the internal components.

BRIEF DESCRIPTION OF THE DRAWING(S)

FIGS. 1*a* and 1*b* refer to an embodiment of the invention where the half shell strength members are fixed to the terminal block with screw-like fasteners.

FIG. 2 illustrates an embodiment where the strength members are fixed to the terminals with pins and a retaining ring is attached around the pin members.

FIGS. 2*a* through 2*d* illustrate various pin member embodiments.

DETAILED DESCRIPTION OF THE INVENTION

Figure 1A:
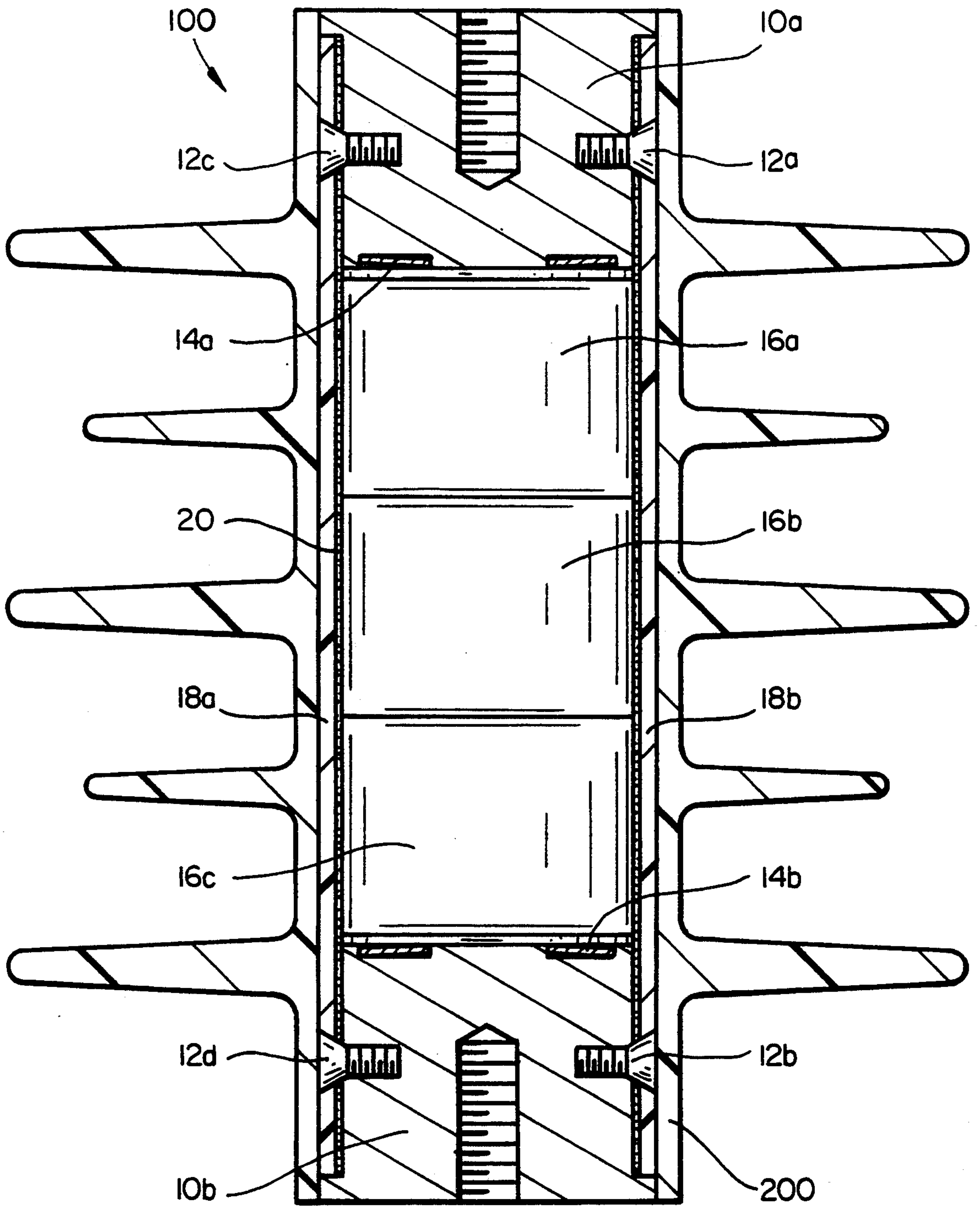

The invention will be more clearly illustrated by referring to the figures of the preferred embodiments. More specifically, FIG. 1*a* illustrates a cross section of a surge arrester 100. The surge arrester comprises conductive end terminals 10*a* and 10*b* of a conductive metallic material such as aluminum, copper, steel, and the like. Between the terminals are one or a plurality of valve elements disks 16*a, b,* and *c,* held under compression between the terminals by the compression members, 14*a* and *b,* such as springs, e.g. Belleville washer, circular spring members, disks spring members, disk springs with radial corrugations, disks with finger spring members, and the like,. and the structural members. Suitable valve elements are disks of doped ZnO, Sr $TiO_2$, $TiO_2$, capacitor elements, resistor elements, and the like. The compression member(s) can be between the disk and end terminals or between disks if more than one disk is used or both locations.

A suitable compressive force is force sufficient for good electrical contact but less than that force which crushes the valve elements, e.g. 200 psi of interfacial pressure. The exact number of valve elements, e.g. disks and the pressure varies depending upon the type of device that is ultimately desired to be created.

While the terminals are held to compress the compression members, two structural half shells, preferably C shaped, of an insulating strength material such as glass -fiber-reinforced-plastic 18*a* and 18*b* are preferably coated on the interior with a moisture sealing material such as, butyl rubber mastic, polyurethane, silicone grease, silicone gel, acrylic, polyether, EPDM gel, butyl gel RTV silicone void filling product GE RTV 88, a product of GE, and the like is preferred and pressed onto and around the varistor disks and Belleville washers and terminals. Alternatively, the sealing material may be coated on the valve elements and end terminals before the structural members are applied. Combinations of applying the sealing material can be used.

The structural members are sufficiently strong to maintain the valve elements in good electrical contact with the end terminals during thermal cycling, and provide resistance against torsional and cantilever forces on the end terminals during installation and service. The structural members must also be sufficiently strong to maintain the integrity of the unit during and after a failure event. The two members structural half-shell design is the particularly preferred embodiment. The members are preferably made of fiberglass with axial and circumferential continuous fibers and resin having sufficient mechanical strength for load transfer to the fibers. The longitudinal fibers provide sufficient longitudinal strength to prevent the outward movement of the end terminals during a failure event, while allowing the member to flex and even crack in a longitudinal direction while not failing in a perpendicular direction. This improves the venting through the longitudinal gap between half-shells.

Figure 1B:
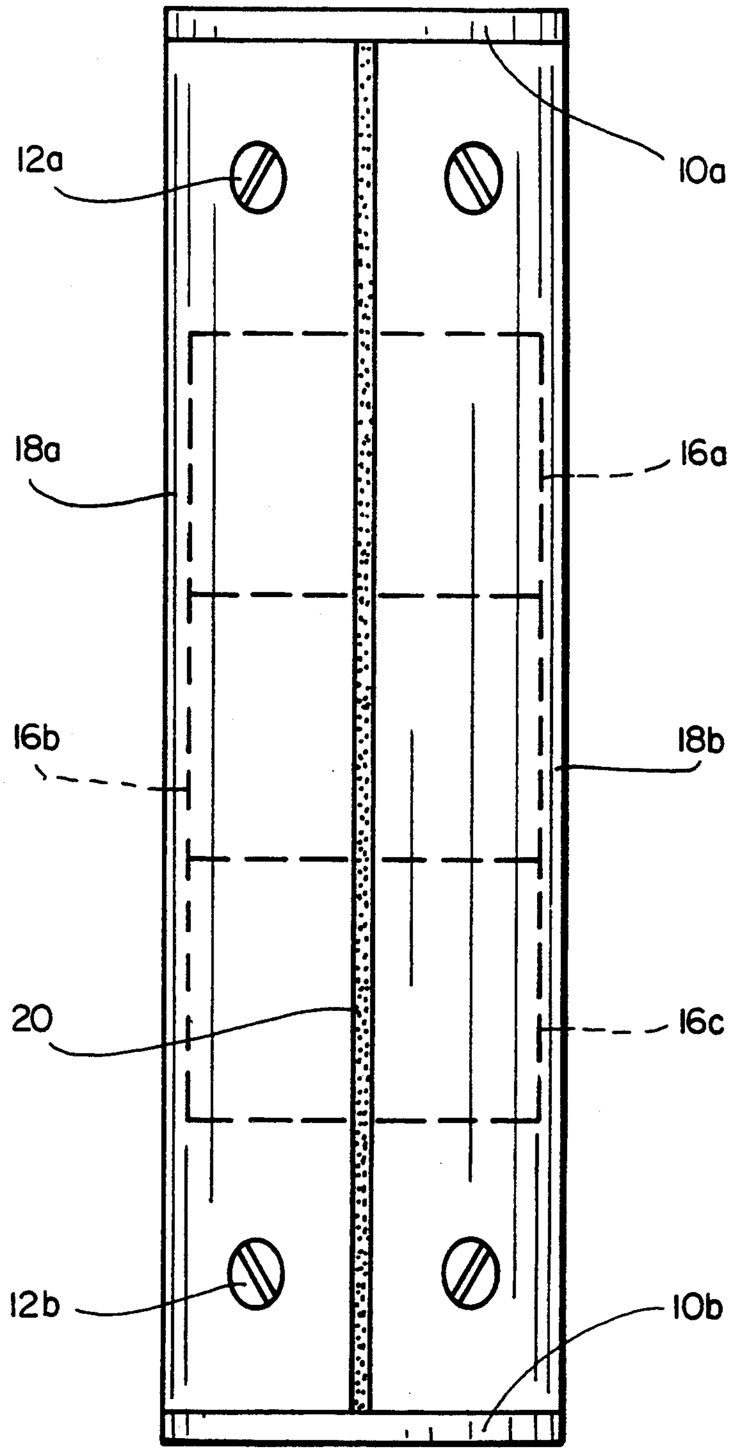

A suitable structural member is made by GlasForms of San Jose, Calif. and has a greater than 50% glass fiber content with epoxy material having sufficient strength to prevent terminal expulsion by a failure event. A preferred glass content is 60%–70% or greater with greater than 20% longitudinal glass content. When assembled, the half-shell strength members have a gap as illustrated in FIG. 1*b* which is filled with the void filling material to provide a moisture insensitive package while permitting venting of the device under failure conditions. A suitable strength member is made by filament winding or a technique known as pultrusion, e.g. pulling glass fibers through a resin mixture then through a die. The shape can also be formed by cutting a tubular member in half. The half shell C shaped segments 18*a* and 18*b* are mechanically affixed to the terminal elements by screws, 12*a,* 12*b,* 12*c,* and 12*d.*

The structural members are of a sufficient strength and thickness to satisfy the torque loadings of the surge arrester while providing sufficient strength to permit the compressive load between the terminals on the varistor disks to be maintained during a useful life general in excess of 10 years. A thickness of 0.04 to 0.2 inches is sufficient for most pole mount applications. The gap 20 , filled with the void filling material between the segments, is generally sufficient to permit the venting of gas. A suitable gap between structural members is about 0.25" to 0.001". Upon the completion of the assembly including the strength elements a non-tracking polymeric shed is bonded, heat shrunk, or molded directly onto the outside of the device. A suitable material for the shed is material made by Raychem and taught in GB 1 530 994 and 1 530 995 the disclosures of which are completely, incorporated herein by reference.

The bonding of the polymeric shed to the structural members is facilitated through a mastic material on the interior of the polymeric shed. A suitable mastic is Raychem S1085 which is a butyl rubber based mastic but any other commercially available moisture sealing mastic or grease or other material can be utilized. The polymeric housing can be fabricated from materials in the previously mentioned GB patents as well as EVA semi-crystalline polymer, EPDM rubber, silicone rubber, silicone semi-crystalline polymers, EPR rubber, and the like. The key aspect of the material is that it must be highly non tracking and capable of withstanding a fault event without shattering into hot fragments. The primary sealant, i.e. the materials between the polymer housing and the structural members, is the primary protection against moisture ingress into the system. However, the polymeric shed material serves as the primary sealant when the housing is molded directly onto the internal components.

The interior void filling compound besides moisture sealing must not structurally bond the structural members to the valve elements because of the differences in thermal coefficient of expansion between these two items which would damage the valve element and the current carrying capability of the device. It is also important that the void filling interior material not move between the varistor disks which would lesson the surface area of the electrical contact and thus the ability of the valve elements to be maintained in good electrical contact with the end terminals.

Returning to the valve element varistor disks **16*a* through 16*c***, these disks can be any suitable material such as a doped zinc oxide, silicone carbide, and the like but a preferred disc is disclosed in U.S. Pat. No. 5,039,452, the disclosure of which is completely incorporated herein by reference for all purposes.

Figure 2:
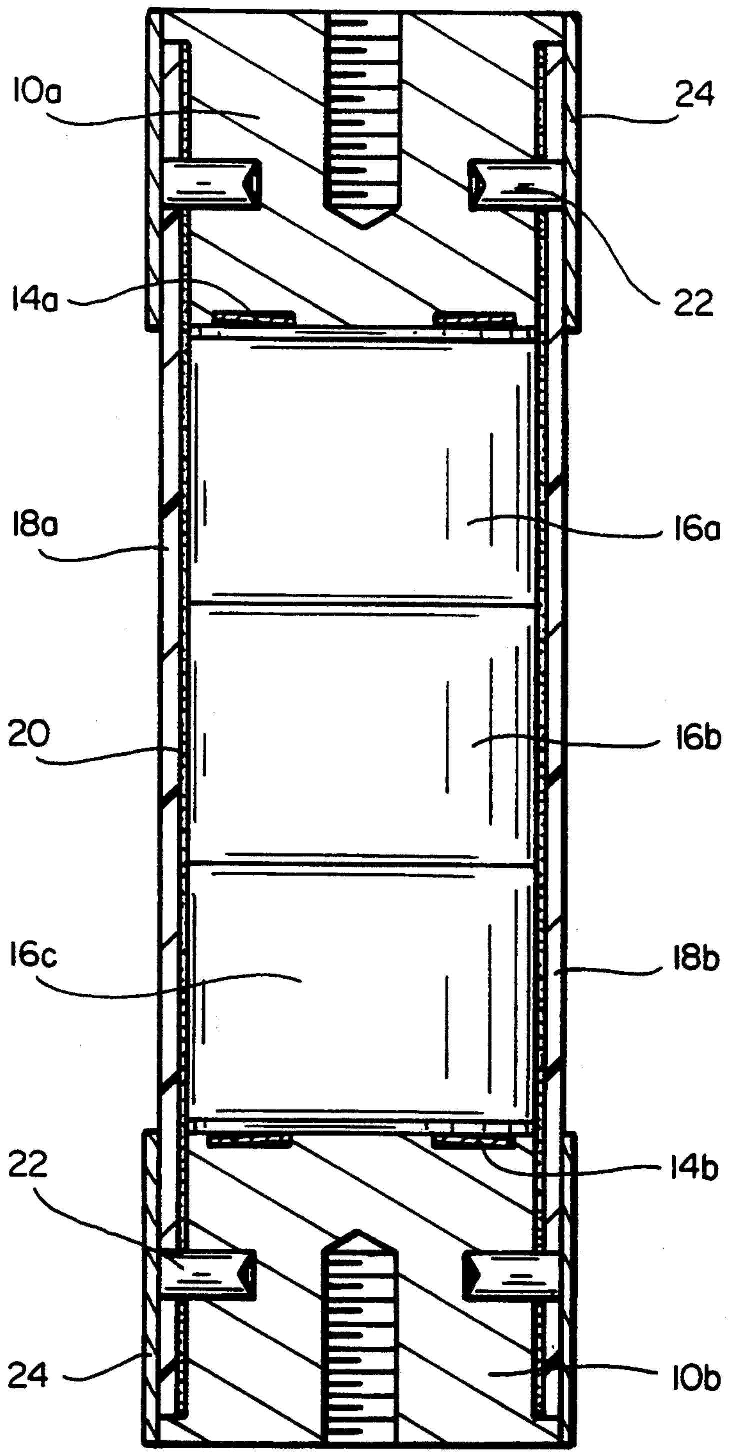
Figure 2A:
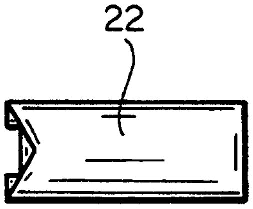
Figure 2B:
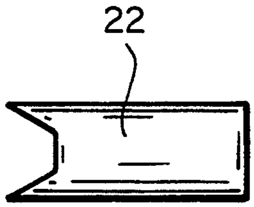
Figure 2C:
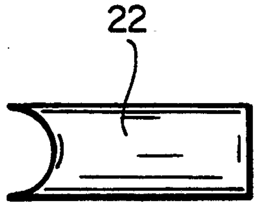
Figure 2D:
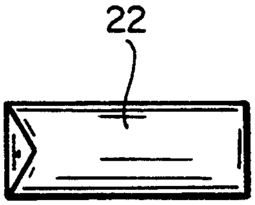

FIG. 2 illustrates an alternative embodiment. Elements which are the same as elements in FIG. **1*a* and FIG. 1*b* are numbered the same in FIG. 2 and throughout the additional embodiment in the drawings. FIG. 2 differs in that the structural sections 18*a* and 18*b* are held to the terminals by mechanical pin members with a retaining band 24** of steel or other suitable material. This embodiment provides a particularly preferred method of potentially forming the structural members to the terminal units by punching through the structural member with the sharpened pin or hollowed tubular pin into the interior of the terminal and thereafter using the retaining ring to maintain it in position. We have unexpectedly found that a sharpened pin can effectively punch through a structural member without injuriously splitting or cracking or delaminating it thus facilitating a manufacturing operation without the need to predrill the structural member. The steel cup/ring functions to restrain lateral motion of the structural members.

Figure 3:
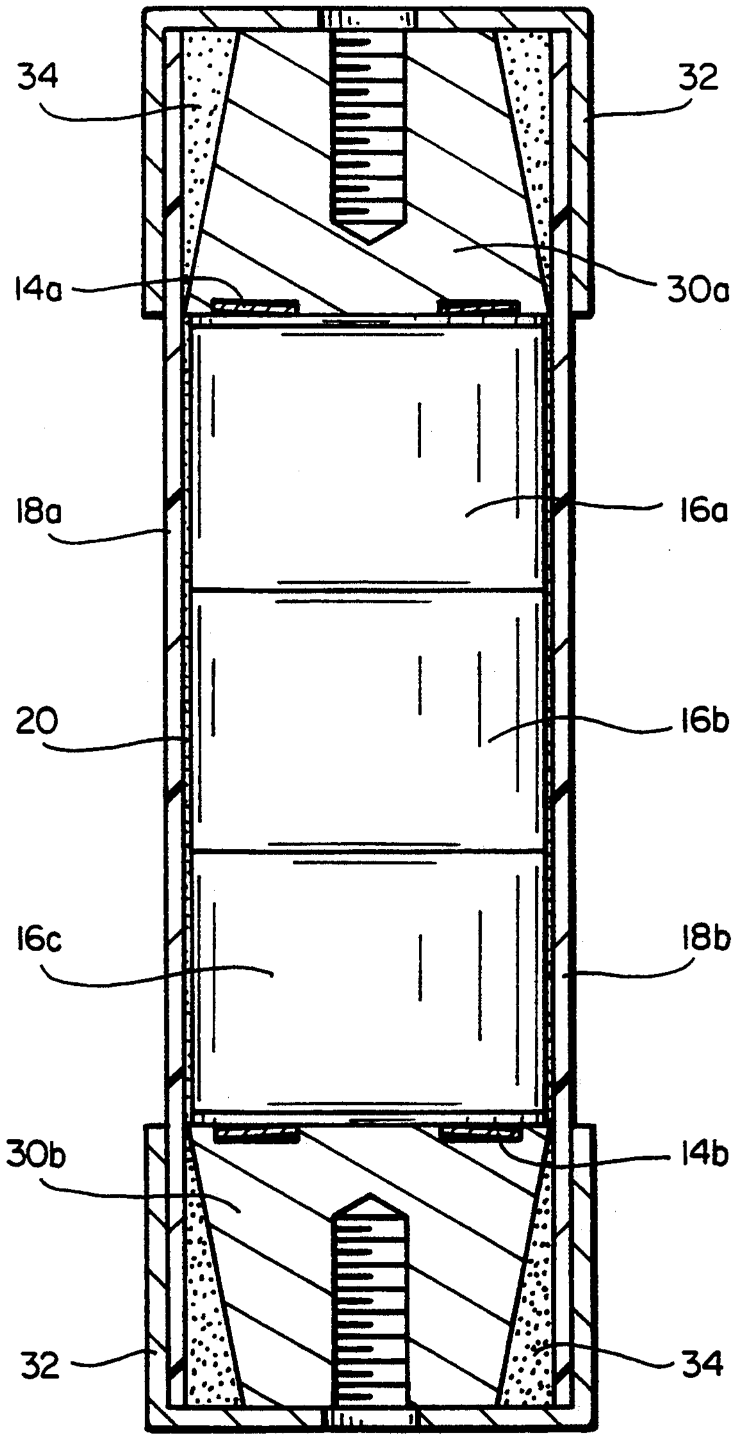
FIG. 3 illustrates an embodiment where the strength members are retained to the terminal blocks with an adhesive wedge and an end cap.

FIG. 3 illustrates an additional alternative embodiment where the valve elements are held in compressive engagement between the terminals by an adhesive wedge and an end cap. In FIG. 3. the adhesive wedge is illustrated as 34 and the end cap is 32 while the terminals are slightly redesigned and as illustrated in **30*a* and 30*b***. The end cap prevents half-shell movement. The adhesive wedge is formed in-situ between the conical, terminal elements and the structural members. The geometry of the wedge is such that forces acting to expel the end terminals, e.g. Belleville washer compression and pressures generated during a failure event, cause the end terminal to interlock with the structural members by load transfer through the adhesive bond between the wedge and the structural members.

Figure 4:
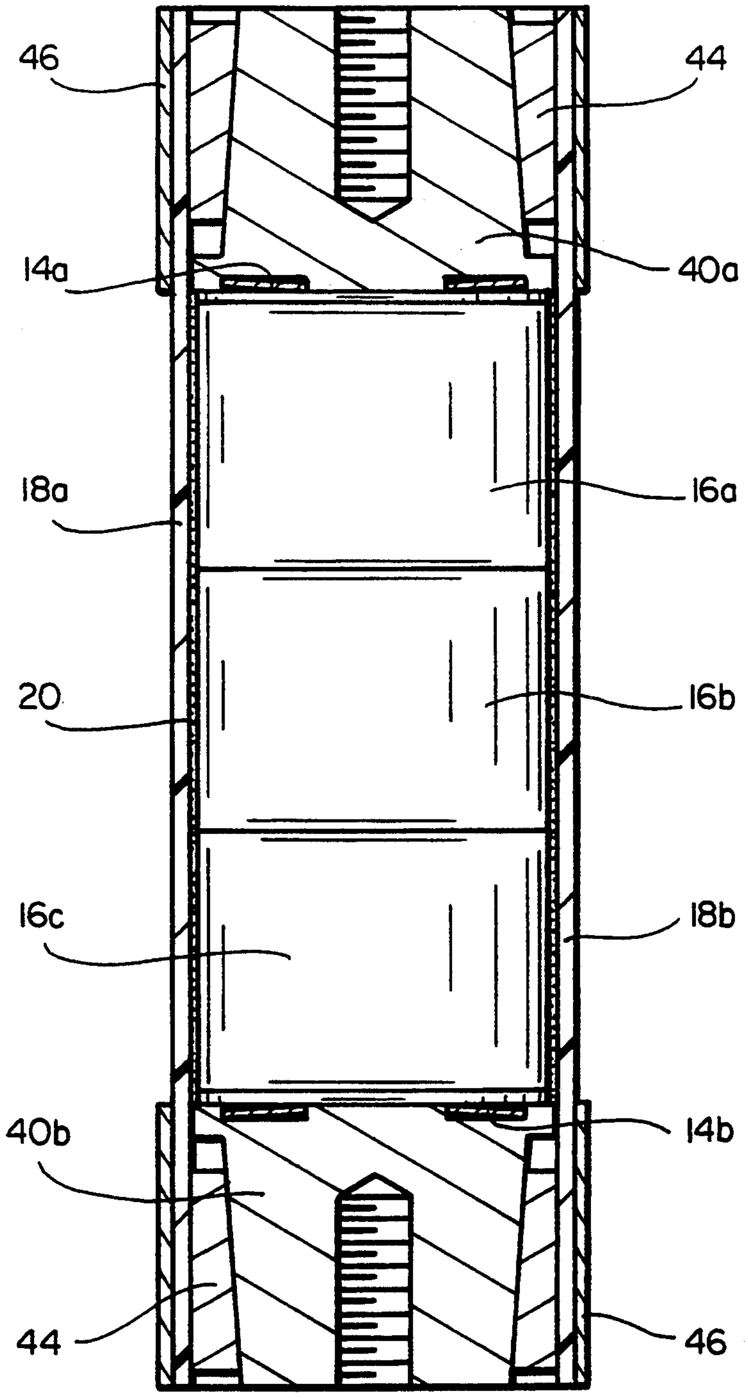
FIG. 4 illustrates an embodiment where the strength members are held to the terminal blocks with a metal wedge and a retaining ring.

FIG. 4 illustrates a mechanical .wedge embodiment where terminals **40*a* and 40*b* hold the disks therebetween and are held in compressive engagement by a metal wedge 44 and a surrounding retaining ring 46**. The mechanical wedge design comprises an electrode with a conical surface. Two semicircular, wedge-shaped pieces are forced in between the electrode and the FRP half shells held by an external ring. The geometry of the pieces are such that forces acting to expel the electrode, e.g. Belleville spring and internal pressures generated during a fault, increase the normal force compressing the FRP thus imparting a "self-locking" feature.

Each of these embodiments is manufactured by substantially the same procedures wherein the disks are longitudinally, e.g. vertically, loaded with compression members and optional conductive spacers onto an end terminal and another terminal is placed on top and then the unit including the compression members and optional spacers is compressed together with a suitable ultimate compression force to provide an interfacial pressure of, 200 psi and the outer half-shell strength members are filled with an appropriate amount of void filling moisture sealing material and pressed fit against the varistor disks and terminals. Alternatively, the sealing material is applied directly to the valve elements and terminals. Thereafter, the sections are affixed to the terminal with screws pins and retaining rings, metal or adhesive wedges and end caps, and the like. Finally, a polymeric shed is applied to the outside of the arrester. The filled gap between the half-shell and the valve element is sufficient to avoid mechanical coupling.

The shed contains the primary outer sealant to seal moisture out and away from the structural members and valve elements. The half-shell shaped sections unexpectedly retain all the benefits of prior tubular strength members but permit a much easier manufacturing operation because the disks do not have to be loaded vertically down a tube and then compressed. Void filling is also enhanced because there is ready access between the interior of the half shells and the valve elements. The additional benefit of this manufacturing method is if a particular half-shell shaped section is noted to be defective, just that section can be removed without the discarding of the whole unit. The strength members being affixed to the terminals through the mechanical means of the screws pins wedges etc. is preferable to bonding as it can be done in a more facile manner with straightforward tooling and does not requiring extensive baking or curing times for epoxies etc.

The surge arrester created by this invention can optionally include more than two arc shaped sections although two are preferred as the best number because of strength and resistance to torsion and cantilever forces. Depending upon the diameter of the varistors, up to about 5 segments can be utilized. In excess of 5 segments and the resistance to torsion decreases substantially as well as requiring more screws or pins to hold the segments in place.

Having described the invention with particularly preferred embodiments, modifications which would be obvious to one of ordinary skill in the art are considered to be within the scope of the invention, for example, the outer shed can be directly molded in place around and to the strength members and end terminals.

What is claimed is:

1. An electrical assembly comprising:

at least 2 valve elements having opposed ends, said at least 2 valve elements arranged end to end to form a stack of valve elements, said stack having two opposing ends and an outer surface;

at lest one resilient conductive spring member associated therewith;

first and second end terminals, said end terminals in forced electrical contact with said opposing ends and said at least one resilient conductive spring element;

at least two structural members having inner and outer surfaces, said structural members fastened so as to maintain compressive forces on said end terminals, said at least one resilient conductive spring element, and said stack of at least 2 valve elements, said structural members providing for two or more longitudinal gaps between said members to provide venting of failure event by-products;

a void filling non-rigidly bonding material between the inner surface of the structural members and the end terminals, valve elements and at least one resilient conductive spring member to provide a substantially void free interface with said valve elements, wherein the void filling material is placed between the adjacent surfaces from the application methods selected from the group consisting of coating the surface of the valve elements, coating the surface of the structural member facing the valve elements, or combinations thereof; and a polymeric housing having inner and outer surfaces, said housing having a substantially void free interface between its inner surface and the outer surface of said structural members.

2. The apparatus according to claim 1 wherein the at least two valve elements are selected from the group consisting of zinc oxide, silicon carbide, strontium titanate, titanium oxide, or combinations thereof.

3. The apparatus according to claim 2 wherein the at least one resilient conductive spring member is selected from the group consisting of Belleville washers, circular spring washers, spring washers, disc springs with radial corrugations, and disc springs with fingers.

4. The apparatus according to claim 3 wherein the structural strength members are affixed to the end terminals by mechanical bonding.

5. The apparatus according to claim 4 wherein the structural strength members are coated on the side facing the valve elements with the non-rigidly bonding material which is moisture sealing.

6. The apparatus according to claim 5 wherein the void filling moisture sealing material is selected from the group consisting of butyl rubber mastic, silicone rubber, butyl rubber, polyurethane, silicone grease, silicone gel, EPDM gel, butyl gel, polyurethane gel, acrylic, polyether and mixtures, combinations thereof.

7. The apparatus according to claim 6 wherein the polymeric housing is non-tracking and is selected from the group consisting of EVA semi-crystalline polymer, EPDM rubber, silicone rubber, silicone semi-crystalline polymers, EPR rubber and mixtures or combinations thereof.

8. The apparatus according to claim 7 wherein the at least two structural strength members are two C shaped sections.

9. The apparatus according to claim 7 wherein the mechanical bonding is done from the group consisting of screwing, pinning, mechanical and adhesive wedges and caps, and combinations thereof.

10. An electrical assembly comprising:

first and second conductive end terminals;

at least one valve element therebetween held in compressive engagement between said first and second end terminals through the compression of at least one compression member;

at least two structural strength members mechanically affixed to the first and second end terminals, said structural strength members having a gap therebetween along the longitudinal edges;

a sufficient amount of a void filling non-rigidly bonding moisture sealing compound between said structural strength members and said at least one valve element to seal any voids therebetween, said void filling non-rigidly bonding moisture sealing compound is placed between the surface of the structural strength members and the end terminals and at least one valve elements by the application methods selected from the group consisting of coating the surface of the structural strength members facing the valve elements and end terminals, coating the end terminals and valve elements or combinations thereof; and an outer non-tracking housing sealed to said end terminals and said structural strength members.

11. The apparatus according to claim 10 wherein the void filling moisture sealing material is selected from the group consisting of butyl rubber mastic, silicone rubber, polyurethane, silicone grease, silicone gel, EPDM gel, butyl gel, polyurethane gel, acrylic, polyether and mixtures, combinations thereof.

12. The apparatus according to claim 10 wherein the mechanical affixing is done from the group consisting of screwing, pinning, mechanical and adhesive wedges and caps, and combinations thereof.

13. The apparatus according to claim 10 wherein the sides of the end terminals and valve elements facing the structural strength members are coated with the moisture sealing non-rigidly bonding material.

14. The apparatus according to claim 10 wherein the at least one valve element is selected from the group consisting of zinc oxide, silicon carbide, strontium titanate, titanium oxide, or combinations thereof.

15. The apparatus according to claim 14 wherein the at least one compression member is selected from the group consisting of Belleville washers, circular spring washers, spring washers, disc springs with radial corrugations, and disc springs with fingers.

16. The apparatus according to claim 15 wherein the structural strength members are affixed to the end terminals by mechanical bonding.

17. The apparatus according to claim 16 wherein the structural strength members are coated on the side facing the valve elements with the moisture sealing and non-rigidly bonding material.

18. The apparatus according to claim 17 wherein the void filling moisture sealing material is selected from the group consisting of butyl rubber mastic, silicone rubber, butyl rubber, polyurethane, silicone grease, silicone gel, EPDM gel, butyl gel, polyurethane gel, acrylic, polyether and mixtures, combinations thereof.

19. The apparatus according to claim 18 wherein the polymeric non-tracking housing is selected from the group consisting of EVA semi-crystalline polymer, EPDM rubber, silicone rubber, silicone semi-crystalline polymers, EPR rubber, and mixtures or combinations thereof.

20. The apparatus according to claim 19 wherein the at least two structural strength members are two C shaped sections.

21. The apparatus according to claim 19 wherein the mechanical affixing is done from the group consisting of screwing, pinning, mechanical and adhesive wedges and caps, and combinations thereof.

22. A method of assembling a surge arrester comprising compressing at least one valve element and at least one compression member between end terminals and applying structural members to the end terminals with a moisture sealing material disposed between the valve element and the structural members, so that upon compression of the structural members against the end terminals and the valve element, the moisture sealing material substantially fills all voids and air gaps; and mechanically attaching the structural members to the end terminals.

23. The method according to claim 22 wherein the structural members are two C shaped glass filled members.

24. The method according to claim 23 wherein the mechanical attaching is performed by screwing, pinning, adhesively wedging, mechanically wedging or combinations thereof.

25. The method according to claim 24 further comprises applying a polymeric shed to the outer surface of the structural members.

26. The method according to claim 25 further comprising applying a sealing material between the polymeric shed and the structural members.

27. A surge arrester apparatus, in combination comprising:

at least one valve element in electrical contact between two end terminals, structural strength members mechanically contacting the end terminals but mechanically isolated from the at least one valve element, a moisture sealing but non-rigid insulating material between the structural strength members and the at least one valve element, and a non-tracking polymeric housing surrounding the longitudinal axis of the valve element and end terminals wherein the structural strength members are at least two shells forming a gapped tubular like strength member having a sufficient interior volume when affixed to said two end terminals to contain the at least one valve element.

* * * * *